Dec. 30, 1952     H. GOLDSCHMIDT     2,623,269
CONVERTIBLE MATERIAL WORKING MACHINE
Filed Aug. 18, 1947     4 Sheets-Sheet 1
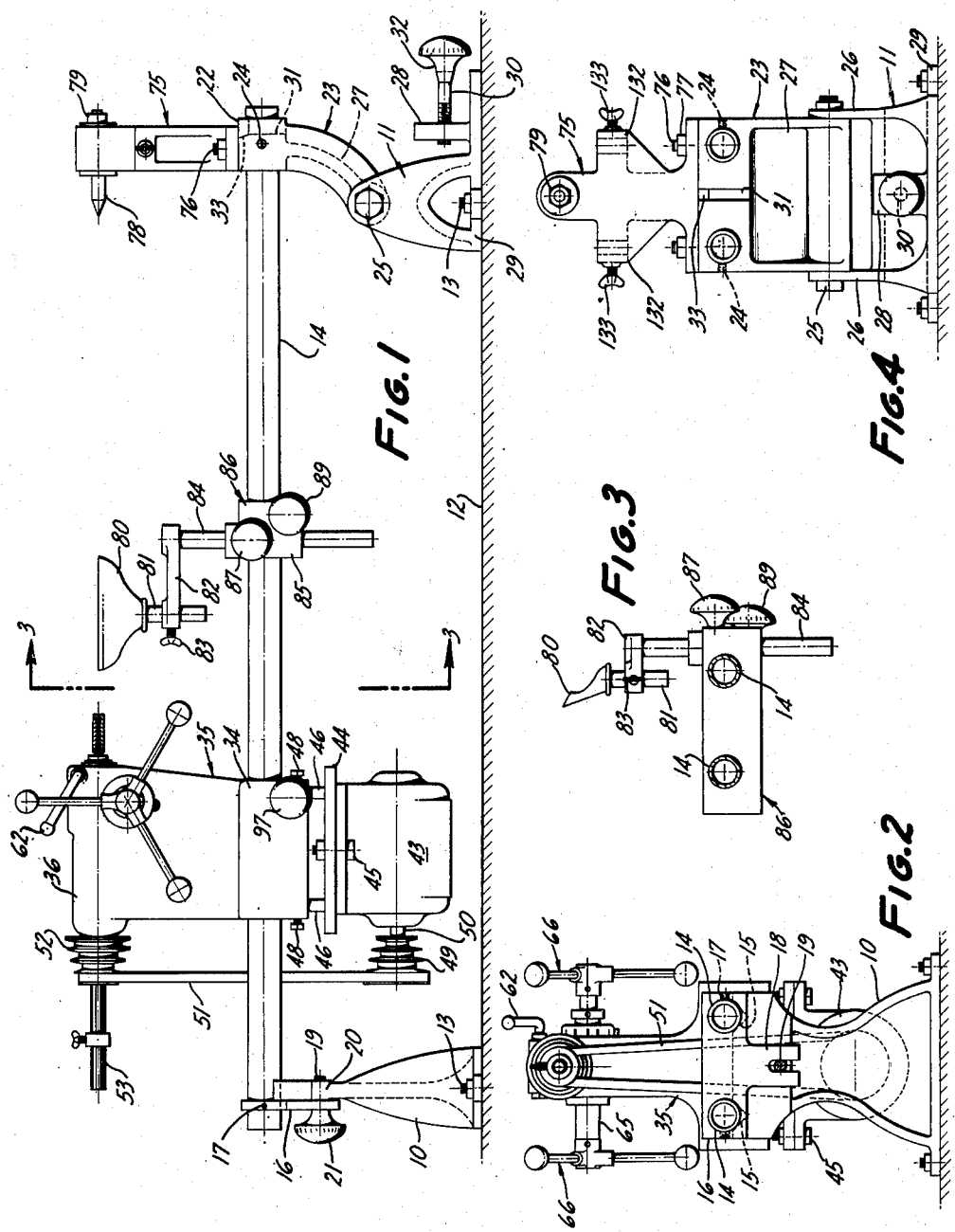
INVENTOR.
HANS GOLDSCHMIDT
BY
Millin + Hanscom
ATTORNEYS

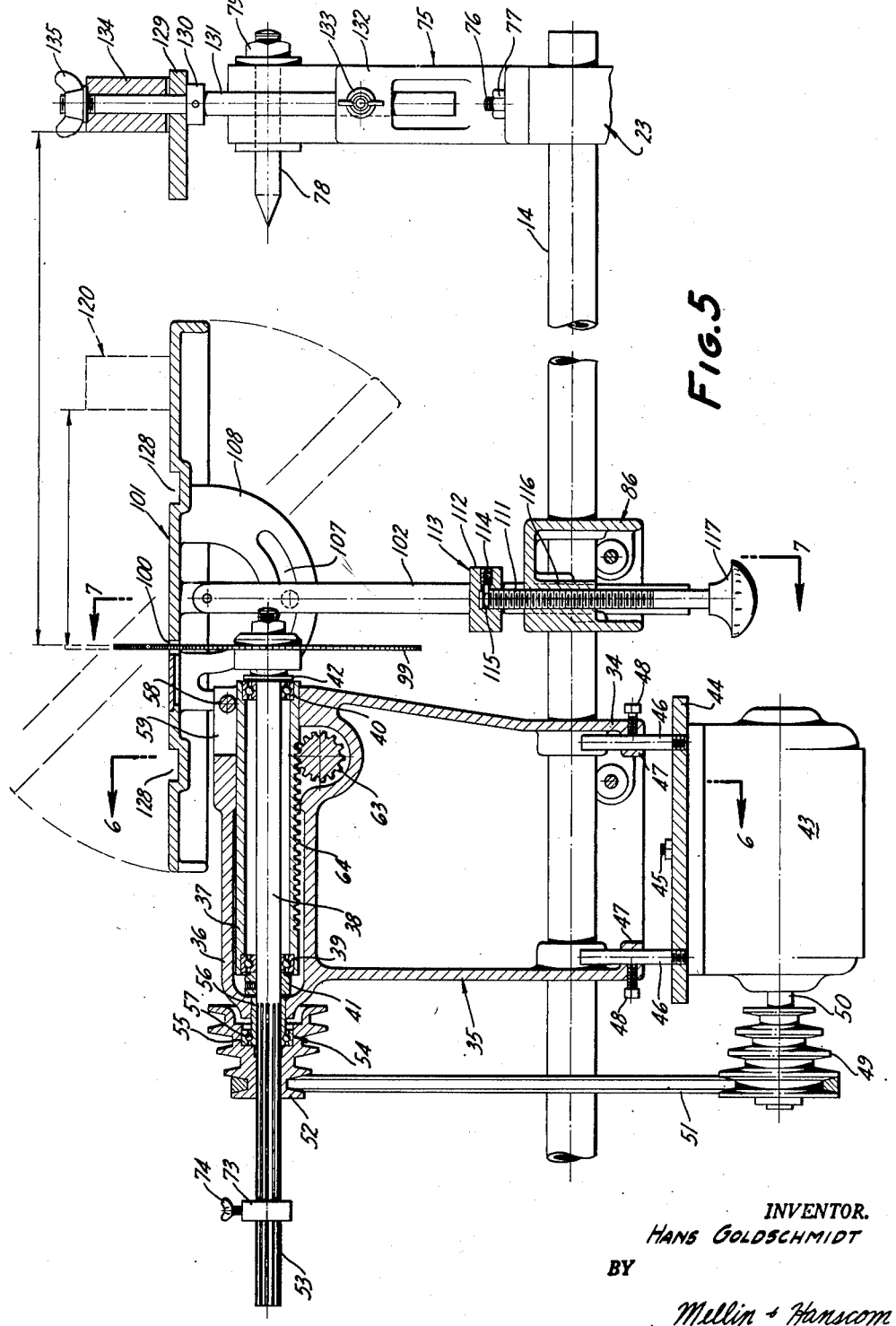

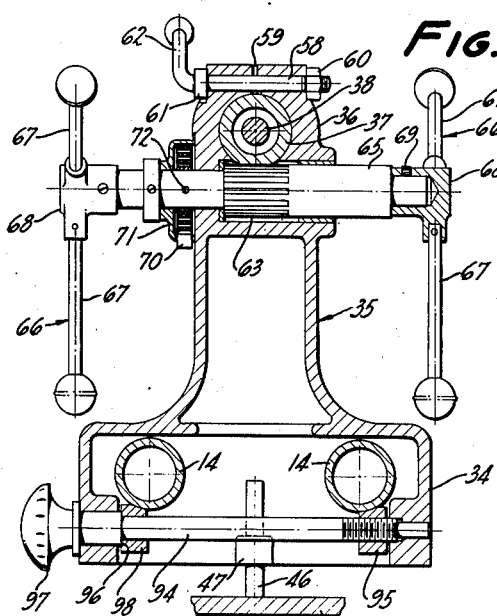
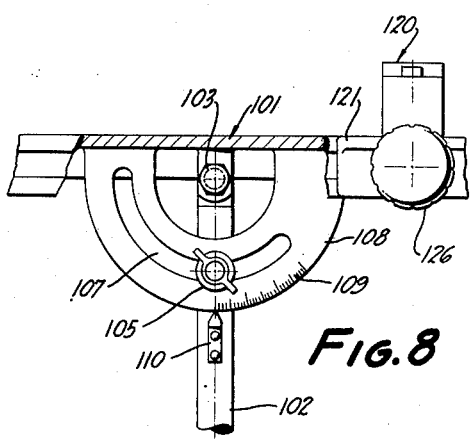
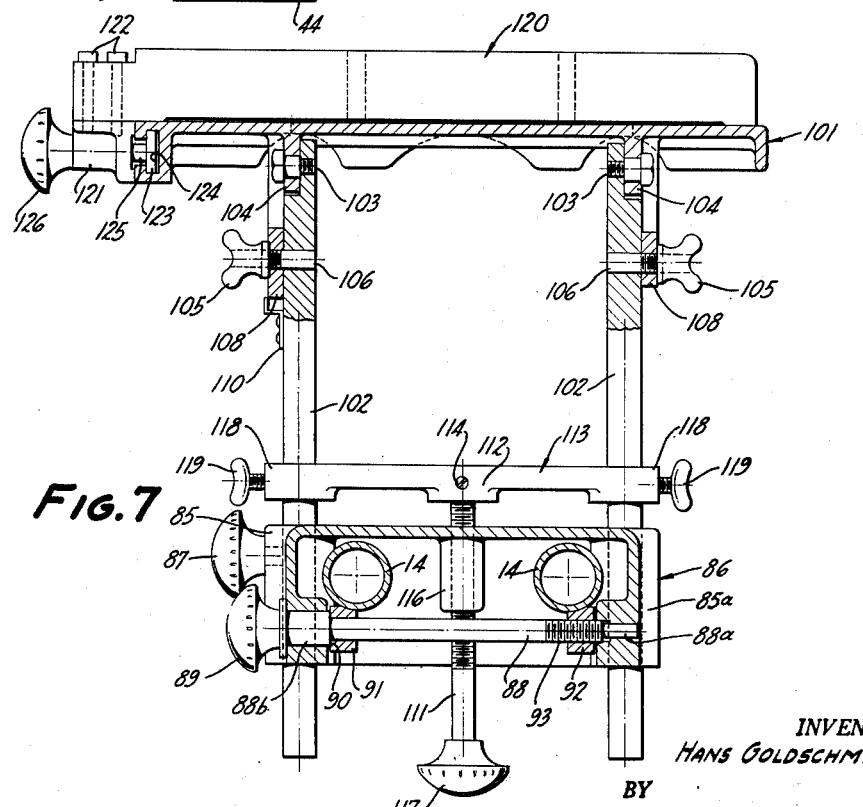

Dec. 30, 1952     H. GOLDSCHMIDT     2,623,269
CONVERTIBLE MATERIAL WORKING MACHINE

Filed Aug. 18, 1947     4 Sheets-Sheet 4

INVENTOR.
HANS GOLDSCHMIDT
BY
Mellin + Hanscom
ATTORNEYS

Patented Dec. 30, 1952

2,623,269

UNITED STATES PATENT OFFICE 2,623,269

CONVERTIBLE MATERIAL WORKING MACHINE

Hans Goldschmidt, Albany, Calif.

Application August 18, 1947, Serial No. 769,148

6 Claims. (Cl. 29—69)

The present invention pertains to material working machines, and more particularly to machines whose components can be variously arranged to perform diverse operations.

An object of the present invention is to provide a material working machine capable of functioning as a lathe, drill press, sander, grinder, power saw, and the like, and in which the work can be mounted in the machine at a convenient or preferred location, depending upon the type of operation to be performed.

Another object of the invention is to provide a convertible material working machine having an adjustable headstock, allowing the work to be placed at a convenient and suitable location along the ways of the machine, depending upon the type of operation to be performed.

A further object of the invention is to provide a material working machine in which the headstock spindle is movable axially to hold the work between it and the tailstock, when the machine is used as a lathe; and in which only such headstock spindle need be moved axially in feeding a drill or other tool into the work, when the machine is used as a drill press.

Still another object of the invention is to provide an improved material working machine which is readily convertible from one type of machine to another, being capable of functioning as a lathe, drill press, power saw, grinder, sander, buffer, router, and the like.

Yet another object of the invention is to provide a material working machine including a carriage slidable along the ways of the machine and adapted to adjustably support a variety of members in various positions.

A further object of the invention resides in the provision of an improved manner of releasably locking the carriage to the ways of a material working machine, to permit its rapid and accurate movement to various positions along such ways.

Another object of the invention is to provide a material working machine embodying a table readily and accurately adjustable in various longitudinal, angular and transverse positions with respect to the headstock and ways of the machine, enabling the table to be employed for diverse purposes.

The invention possesses many other advantageous features, some of which with the foregoing will be set forth at length in the following description, where that form of the invention, which has been selected for illustration and the drawings accompanying and forming a part of the specification, is outlined in full. In said drawings, one form of the invention is shown, but it is to be understood that it is not limited to such form since the invention as set forth in the claims may be embodied in a plurality of forms.

Referring to the drawings:

Fig. 1 is a side elevation of the machine arranged for use as a lathe.

Fig. 2 is an end elevation as seen from the left of Fig. 1.

Fig. 3 is a section taken generally along the line 3—3 on Fig. 1.

Fig. 4 is an end elevation, as seen from the right of Fig. 1.

Fig. 5 is a combined partial longitudinal section and front elevation of the machine, arranged for use as a power saw.

Fig. 6 is a transverse section taken generally along the line 6—6 on Fig. 5.

Fig. 7 is a transverse section taken generally along the line 7—7 on Fig. 5.

Fig. 8 is a partial longitudinal and sectional view of a table adjusting and locking device, as seen from the left of Fig. 7.

Fig. 9 is a partial front elevation of the machine adapted for use as a disk sander.

Fig. 10 is a partial side elevation of the machine, arranged for use as a vertical drill press.

The machine, as disclosed in Figs. 1 to 4, inclusive, is adapted for use as a lathe, and includes a head end pedestal, standard or leg 10 and a tail end standard pedestal or leg 11, both of which are suitably secured to a bench or table 12 by bolts 13 or the like. In addition to the end standards, the frame of the machine includes a pair of parallel longitudinal tubular ways 14 resting at one end in like recesses or saddle grooves 15 at the upper end of the head end standard 10. A bracket 16 is secured over the ways by set screws 17, and has a depending bifurcated leg portion 18 extending over a lock screw 19 threaded into a boss 20 in the standard, with the head or knob 21 of the screw bearing against the leg 18, thus securing the bracket 16 to the standard, with the ways 14 nesting firmly in its saddle grooves 15.

The other or tail ends of the parallel ways 14 extend through bosses 22 in a bracket 23, to which they are secured by set screws 24 or the like. The lower end of this bracket 23 is mounted upon a hinge bolt 25 extending between the side uprights 26 of the tail end standard 11, in order to permit the ways 14 and supporting bracket 23 to be swung between horizontal and vertical positions. The ways can be swung from the horizontal position disclosed in Fig. 1 until the outer face 27 of the bracket engages a supporting arm 28 extending upwardly from the base 29 of the tail end standard 11 (see Fig. 10). When the face engages such supporting arm, the tubular ways 14 are disposed in a vertical position, being held in the latter location by a lock screw or stud 30 which extends into an outer groove or channel 31 in the bracket 23 when the latter has been disposed against the supporting arm 28. The stud 30 is threaded into the arm 28, with its tapered head 32 engaging a companion countersunk or tapered portion 33 in the groove 31, to lock the bracket 23 with the ways 14 disposed in a vertical position.

The tubular ways extend slidably through the base 34 of a headstock 35, having a housing 36 at its upper portion receiving a quill 37, in which a spindle 38 is rotatably mounted. Antifriction ball bearings 39, 40 are disposed at the ends of the quill 37 for transmitting both axial and radial loads between the latter and the spindle 38. The rear bearing 39 is maintained in proper position between the quill and spindle by a collar 41 secured to the spindle 38, while the forward bearing 40 is maintained in position by a suitable lock nut 42 threaded on the spindle. The spindle is rotated by an electric motor 43, or other suitable prime mover, secured to a mounting plate or bracket 44 by bolts 45. Upwardly extending studs 46, threaded into the bracket 44, project through oppositely disposed lugs 47 formed on the headstock base 34, the studs being secured in any desired position of adjustment by the clamping action thereagainst of cap screws 48 threaded into the lugs 47.

A stepped driving pulley 49 is secured to the motor shaft 50, transmitting its motion through a belt 51 to a driven stepped pulley 52 slidably keyed to the rear splined portion 53 of the headstock spindle 38. This stepped pulley 52 is prevented from moving axially through an end and radial thrust type of bearing 54 whose outer race 55 is secured within the pulley 52 and whose inner race is constituted by a sleeve 56 secured to the rear of the headstock housing 36, there being suitable balls 57 between the races for transmitting end thrust therebetween with a minimum of friction. By shifting the motor mounting studs 46 within the lugs 47, the belt 51 can be tightened to the desired extent.

The headstock spindle 38 and its supporting quill 37 are movable longitudinally and parallel to the ways 14 within the housing 36, and may be clamped in any desired lengthwise position by a lock bolt 58 extending through forward split housing portions 59 (see Fig. 6), there being a nut 60 threaded on the bolt and bearing against one side of the housing 36 and a collar 61 on the opposite side of the bolt bearing against the other side of the housing. A suitable clamping lever 62 may be formed integral with, or otherwise secured to, the lock bolt 58 to permit its ready tightening and loosening in clamping the housing portions 59 to the quill 37.

Upon loosening of the lock bolt 58, the quill and spindle contained therein may be moved longitudinally in either direction within the housing 36 through rotation of a pinion 63 engaging a rack 64 formed on the underside of the quill 37 (see Figs. 5 and 6). The pinion is integral with, or is otherwise suitably secured to, a pinion shaft 65 extending transversely of the quill and in opposite directions through the housing 36. A suitable feed lever 66 may be secured to each end of the pinion shaft 65 on opposite sides of the headstock 35, and such lever may be formed with a plurality of radial lever arms 67 secured to a common hub 68 affixed to the pinion shaft 65 by a set screw 69 or the like, to permit the quill 37 and spindle 38 to be moved longitudinally of the headstock from either side of the machine.

The quill and spindle are moved in one direction, as toward the tail end of the machine, through appropriate manipulation of either lever mechanism 66, and it is movable in the opposite direction by such mechanism, or automatically by a spring device, consisting of a spiral spring 70 contained within a spring housing 71 suitably secured to the headstock 35. One end of the spring is attached to the spring housing 71 and its other end to the pinion shaft 65 by a pin 72 or the like. The spring 70 is so wound or coiled that it tends to rotate the pinion 63 in a direction to retract the quill 37 and spindle 38 within the headstock, or away from the tail end of the machine. Movement of the quill and spindle toward the tail end of the machine may be limited by a stop collar 73 adjustably secured on the headstock spindle 38 by a lock screw 74 and adapted to bear against the end of the driven pulley 52.

When used as a lathe, the machine is disposed with its parts arranged generally in the Fig. 1 position and with a tailstock 75 secured to the tail end bracket 23 by studs 76 and cooperable nuts 77. A spindle 78 extends through the upper portion of the tailstock, and is secured thereto by a nut 79 mounted on the outer threaded end of the spindle. The headstock spindle 38 may have a suitable member mounted on its threaded end, such as a face plate (not shown) or chuck, the work being mounted and held between the tailstock and headstock spindles 78, 38 through manipulation of either of the feed levers 66 and movement of the quill 37 and spindle 38 toward the tailstock 75, after which the lock bolt 58 is tightened to prevent further axial movement of the quill and spindle.

When used as a lathe, a tool rest 80 is provided on a suitable post 81 disposed within a tool holder 82, and secured thereto in any desired position of adjustment by a clamp screw 83. The tool holder has a rod 84 extending through a boss 85 at one side of a carriage 86 slidably mounted on the tubular ways 14 of the machine. This rod 84 may be moved vertically within the carriage and be held in any suitable position by a lock screw 87 threaded into the outer end of the carriage and adapted to bear against the rod.

As more clearly seen in Fig. 7, the ways 14 extend slidably through the carriage 86 to permit the latter to be moved longitudinally therealong. The carriage may be clamped in various longitudinal positions along the ways by a clamping device including a lock shaft 88 extending under and transversely of the ways 14, one end 88a of the shaft being rotatably piloted within one side of the carriage and its other end 88b secured to a knob or handle 89 rotatably in the other side of the carriage. A shoulder 90 in the knob is adapted to engage the outer surface of a lock block 91 engageable with one way 14, there being another lock block 92 internally threaded to engage companion external threads 93 on the lock shaft 88 and adapted to bear against the other way 14. By turning the lock shaft 88 in one direction, as righthand, it becomes apparent that the lock blocks 91, 92 are urged toward each other and against the ways 14, 14, thus clamping the carriage 86 in the desired longitudinal position of adjustment along the latter.

It is to be noted that the tailstock 75 is fixed, in the specific form of invention disclosed in the drawings, but that the headstock 35 is longitudinally movable along the ways 14, carrying the motor 43 and belt and pulley driving mechanism 49, 51, 52 with it as a unit. The mechanism for securing or locking the headstock at any desired position of adjustment along the ways 14 is similar to that just described in connection with the releasable locking of the carriage 86 to the ways, consisting of a transversely extending lock shaft 94 rotatably mounted in the headstock base 34 and having a lock block 95 adjacent one end adapted to engage one of the tubular ways 14, with the shoulder 96 of a handle or knob 97 engaging the other lock block 98, which, in turn, is adapted to be clamped to the other way 14 upon suitable rotation of the lock shaft.

When it is desired to utilize the machine as a lathe, the headstock lock shaft 94 may be rotated in a proper direction to release the lock blocks 95, 98 from the ways 14, which allows the headstock 35 to be moved toward or away from the tailstock 75, depending upon the length of the work to be mounted therebetween. When the approximate and appropriate distance has been thus provided between the head and tail stocks, the lock shaft 94 is rotated to clamp its blocks 95, 98 against the ways 14 and hold the headstock 35 in fixed position. The work may now be placed between the head and tail stocks and the lock bolt 58 loosened to permit either feed lever 67 to shift the quill 37 and spindle 38 toward the work, until it is secured in proper position between the headstock and tailstock spindles 38, 78, whereupon the lock bolt 58 is tightened to clamp the split housing portions 59 to the quill 37 and prevent further longitudinal movement of the latter and the headstock spindle or shaft 38. The tool rest 80 may be appropriately located with respect to the work through shifting of the carriage 86 in the ways 14 and operation of the lock screw 87 and the lock shaft 88, and the motor 43 started to rotate the headstock spindle 38 at the appropriate speed, allowing a turning operation to be performed upon the work secured between the head and tail stock spindles.

The machine may also be used for other purposes, as for example, a power saw. As seen in Figs. 5, 7 and 8, a circular saw 99 may be suitably secured on the headstock spindle 38, extending through a slot 100 in a work table 101, which is adjustably supported on the carriage 86. Specifically, a pair of vertical rods or standards 102 extends through the carriage bosses 85, 85a, such rods having shoulder bolts 103 threaded in their upper ends and receiving the lugs or ears 104 of the table 101, in order to permit pivotal movement of the latter on the rods. The table 101 may be swung to a variety of angular positions and can be held in such angular positions by wing nuts 105 threaded on studs 106 secured to the rods 102 and extending through arcuate slots 107 on guide sectors or arcuate brackets 108 depending from the table. Tightening of the nuts 105 obviously clamps the brackets 108 to the rods 102 and prevents their relative movement, whereas loosening of the wing nuts 105 permits pivoting movement of the table about the common axis of the shoulder bolts 103 to the desired angular extent, as determined by an indicator dial 109 on one of the brackets cooperating with a pointer 110 suitably secured to one of the rods.

In addition to being angularly adjustable with respect to the spindle, the table 101 is also transversely adjustable with respect thereto. The upper end of an elevating screw 111 extends within the central boss 112 of an elevating platen 113, being swivelly or rotatably mounted therein through a set screw 114 threaded into the boss and received within a groove 115 at the upper end of the screw. The screw 111 has a threaded shank portion cooperating with an internally threaded central boss 116 on the carriage 86, and also a suitable knob or handle 117 at its lower end to facilitate rotation of the screw 111 and movement of the elevating platen 113 upwardly or downwardly, as the case may be.

The platen has outer bosses 118 through which the vertical rods 102 extend, the latter members being releasably secured to the platen by lock screws 119 extending through the bosses 118 and adapted to bear against the rods. Upon loosening of the carriage lock screw 87, which bears against one of the rods 102 the elevating screw 111 may be turned to move the table 101 upwardly or downwardly with respect to the spindle 38 and axis of the circular saw 99. If rapid table movement is desired, both the carriage lock screw 87 and wing screws 119 extending through the platen bosses 118 may be loosened, allowing bodily movement up to table 101 and rods 102 transversely of the headstock spindle and circular saw. Obviously, tightening of the various lock screws 87, 119 secures the rods 102 and the table 101 in adjusted position.

The table may be provided with a rip fence 120 secured to a head 121 by cap screws 122 or the like. A lock block 123 is positioned within a groove 124 in a side face of the table 101, a threaded shank 125 extending outwardly through the head 121 and threaded into a knob 126 adapted to bear against the head 121 in effecting its clamping to the table 101, in order to fix the rip fence 120 in the desired position therealong. Also an angularly adjustable guide bracket device 127 (see Fig. 9) may be mounted within one of the transverse channels 128 on the table, to permit the work to be positioned angularly with respect to the circular saw 99, in a known manner.

As disclosed in Fig. 5, the headstock 35 and carriage 86 may be suitably positioned along the ways 14 and then locked in such position with respect to the tail end of the mechanism, depending upon the work to be performed. If necessary, an additional supporting table 129 may be secured to the tailstock 75, resting upon collars 130 secured to guide rods 131 extending through side bosses 132 on the tailstock and adapted to be secured in various vertical positions within the tailstock by lock screws 133 extending through the bosses and engaging the rods 131. A fence 134, or the fence 120, may also be disposed over the rods 131 and secured against the table 129 by wing nuts 135 threaded on the upper ends of the rods. The appropriate provision of the headstock 35 and the carriage 86 along the ways with respect to the tailstock 75 allows the fence 134 to be disposed the desired distance from the circular saw 99 and enables much longer wood or other materials to be guided in cutting than through use of the main table 101 alone.

The machine may be converted into a disk sander, as disclosed in Fig. 9, by mounting a sander disk 136 on the headstock spindle 38 and by employing the same table and supporting mechanism, or the equivalent, as used in connection with the circular saw machine, disclosed in Figs. 5 and 7. Because of the longitudinal adjustability of the headstock 35 and carriage 86 and their associated mechanisms along the ways 14, the table 101 and disk sander 136 may be disposed adjacent the tail end of the machine, allowing work to be fed against and moved along the sander disk 136 from the end of the machine without interference from any of the machine components.

In connection with the conversion of the machine to a disk sander, the angularly adjustable guide bracket 127 may also be mounted in a channel 128 of the table, in order that various angles may be ground in the work.

As mentioned before, the machine may also be moved to the vertical position, disclosed in Fig. 10, to permit its use as a vertical drill press. The table 101 is swung on its pivot bolts 103 until it is disposed perpendicular to the tubular guide ways 14, which also disposes the face of the table perpendicular to the headstock spindle 38. A chuck 137, in which a drill 138 is mounted, may then be placed on the headstock spindle and the motor and belt transmission 43, 50, 49, 51, 52 operated to rotate the spindle 38 and drill 138 at the desired speed. In the use of the drill press, the lock bolt lever 62 is released to permit the quill 37 and spindle 38 to be moved downwardly toward the work in order to feed the drill 138 thereinto.

The headstock 35 and associated mechanism may be moved along the parallel ways 14 and then locked in appropriate position above the table 101, the latter, through the carriage 86, having been adjusted along the ways 14 to dispose it at a convenient working height. Following the relative disposition of the headstock and table at the appropriate positions, it is merely necessary to feed the quill 37 and spindle 38 downwardly toward the work, in order to drill holes therein or to perform other suitable operations thereon. During the manipulation of the feed levers 67 to move the drill into the work, additional tension is imparted to the coil spring 70, which will retract the quill and spindle to their initial positions upon release of the manual effort on the feed levers 67. While the spring 70 thus can effect full retraction of the spindle and the drill with respect to the work, downward movement of the spindle 38 may be limited by engagement of the lock collar 73 with the end of the driven pulley 52. Such lock collar is adjustable on the spindle 38 through the action of the lock screw 74, in order to variously determine the scope of travel of the spindle relative to the table.

It is to be noted that the axis of the hinge bolt 25 is located substantially to one side of the vertical center line through the center of mass of the machine, when converted for use as a vertical drill press, the resulting lever arm through which the weight of the machine is acting increasing its stability and maintenance in a vertical position.

While the machine has been described with particular reference to its use as a lathe, power saw, sander and drill press, it will be apparent that it has other uses, depending upon the kind of tool or work secured to the headstock spindle 38 and mounted upon the carriage 86.

It is, accordingly, apparent that a convertible material working machine has been devised, in which the headstock portion is movable along the ways to enable the work to be performed at convenient locations, depending upon the particular operation to be performed and the size and shape of the work itself. The ability to move the headstock spindle 38 within the headstock 35 enables the machine to function as a drill press through the simple expedient of moving the spindle alone, and without requiring the entire headstock to be moved. This feature also allows the same spindle to function as a device for securing the work between its and the fixed tailstock spindle 78, when the machine is to be used as a lathe. Both the carriage 86 and the headstock 35 are readily adjustable along the ways 14 and are securely clamped in adjusted position by comparatively simple mechanisms, while the table 101 can be readily adjusted longitudinally along the ways, as well as angularly and vertically with respect to the particular tool secured to the spindle 38, through a mechanism which can be manipulated easily and rapidly.

Having thus described my invention, what I claim and desire to secure by Letters Patent is:

1. A material working machine, including a frame having a horizontal position, a headstock mounted on said frame and adjustable longitudinally therealong, a spindle rotatably mounted in said headstock, means for moving said spindle longitudinally of said headstock and frame, a carriage adjustable longitudinally along said frame, a work supporting table having a portion extending longitudinally beyond said carriage, said table having a rotary-tool-receiving slot therethrough, and means adjustably mounting said table on said carriage, said mounting means including means for vertical adjustment of said table relative to said carriage to an elevation above said spindle and for swinging movement about a horizontal axis transverse to said spindle between positions parallel and perpendicular to said spindle.

2. A material working machine, including a frame having a horizontal position, a headstock mounted on said frame and adjustable longitudinally therealong, a spindle rotatably mounted in said headstock, a carriage adjustable longitudinally along said frame, a work supporting table having a portion extending longitudinally beyond said carriage, said table having a rotary-tool-receiving slot therethrough, and means adjustably mounting said table on said carriage, said mounting means including means for vertical adjustment of said table relative to said carriage to an elevation above said spindle and for swinging movement about a horizontal axis transverse to said spindle between positions parallel and perpendicular to said spindle.

3. A material working machine, including a frame having a horizontal position, a support for said frame, a headstock mounted on said frame, said headstock being slidably movable relative to said support, a spindle rotatably mounted in said headstock, a carriage adjustable longitudinally along said frame, a work supporting table having a portion extending longitudinally beyond said carriage, said table having a rotary-tool-receiving slot therethrough, means slidably mounting said table on said carriage for vertical movement relative thereto to an elevation above said spindle, and means pivotally mounting said table on said supporting means for movement between positions parallel and perpendicular to said spindle about a horizontal axis transverse to said spindle.

4. A material working machine, including a frame having a horizontal position providing longitudinal ways, a support at the tail end of said frame, a bracket secured to said ways and pivotally mounted on said support for swinging movement of said ways between horizontal and vertical positions, a headstock slidable longitudinally along said ways, a spindle rotatably mounted in said headstock, means for moving said spindle longitudinally of said headstock, a carriage slidable along said ways, a work supporting table having a portion extending longitudinally beyond said carriage, said table having a rotary-tool-receiving slot therethrough, and means adjustably mounting said table on said carriage, said mounting means including means for vertical adjustment of said table relative to said carriage to an elevation above said spindle and for swinging movement about a horizontal axis transverse to said spindle between positions parallel and perpendicular to the axis of said spindle.

5. A combination tool comprising: a pair of horizontally disposed ways; a support for said ways; a headstock mounted on said ways; said headstock being slidably movable relative to said support; a spindle rotatably mounted in said headstock above and parallel to said ways; a carriage mounted on said ways for movement to and from said headstock; an upwardly extending, vertically adjustable standard mounted on said carriage; a work supporting table pivoted to said standard on a horizontal axis transverse to and above said ways for movement from a horizontal position above said ways to a vertical position normal to and intersected by the axis of said spindle, said table having a portion extending horizontally beyond said carriage, said table containing a slot therethrough for penetration of a rotary tool mounted on said spindle, said table when horizontally disposed being positionable over said spindle.

6. A combination tool comprising: a pedestal; ways lying in a given plane pivoted adjacent one end thereof to said pedestal for movement through an angle of at least 90° with respect thereto; a headstock mounted on said ways; said headstock being slidably movable relative to said pedestal; a spindle rotatably mounted in said headstock; a carriage mounted on said ways for sliding movement therealong to and from said headstock; a standard mounted on said carriage for movement in a plane transverse to the plane of said ways; a work supporting table pivotally connected to the outer end of said standard for movement from a position over and parallel with the plane of said ways to a position perpendicular to said plane and normal to and intersected by the axis of said spindle, said table having a portion extending horizontally beyond said carriage, said table containing a slot therethrough for penetration of a rotary tool mounted on said spindle.

HANS GOLDSCHMIDT.

REFERENCES CITED

The following references are of record in the file of this patent:

UNITED STATES PATENTS

| Number | Name | Date |
|---|---|---|
| 663,182 | Messinesi | Dec. 4, 1900 |
| 1,571,745 | Warner | Feb. 2, 1926 |
| 2,013,778 | Halvorsen et al. | Sept. 10, 1935 |
| 2,089,362 | Haas | Aug. 10, 1937 |
| 2,089,363 | Haas | Aug. 10, 1937 |
| 2,105,009 | Roebuck | Jan. 11, 1938 |
| 2,157,241 | Manning | May 9, 1939 |
| 2,200,799 | Miller | May 14, 1940 |
| 2,364,396 | Stahler | Dec. 5, 1944 |
| 2,367,461 | Emmons | Jan. 16, 1945 |
| 2,369,963 | Gleason | Feb. 20, 1945 |
| 2,430,677 | Hobart | Nov. 11, 1947 |
| 2,438,235 | Strom | Mar. 23, 1948 |
| 2,555,582 | Edwards | June 5, 1951 |